United States Patent [19]

McCadden

[11] Patent Number: 4,937,908
[45] Date of Patent: Jul. 3, 1990

[54] RETRACTABLE VEHICLE WASH APPARATUS

[75] Inventor: Dennis R. McCadden, Arvada, Colo.

[73] Assignee: Mark VII Equipment, Inc., Arvada, Colo.

[21] Appl. No.: 313,626

[22] Filed: Feb. 21, 1989

[51] Int. Cl.$^5$ .............................................. B60S 3/04
[52] U.S. Cl. ................................. 15/97 B; 15/DIG. 2
[58] Field of Search .................. 15/97 B, 53 R, 53 A, 15/53 AB, DIG. 2

[56] References Cited

U.S. PATENT DOCUMENTS 4,207,643  6/1980  Beer et al. ........................... 15/97 B
4,541,874  9/1985  Smith .................................. 15/97 B

FOREIGN PATENT DOCUMENTS

1188599  6/1985  Canada ................................ 15/97 B

*Primary Examiner*—Edward L. Roberts
*Attorney, Agent, or Firm*—Gary M. Polumbus

[57] ABSTRACT

A vehicle wash apparatus is disclosed as including a curtain of flexible scrubbing strips which are suspended from an orbiting support member adapted to selectively have the strips wrapped there around to elevate the strips from the path of movement of a vehicle through the apparatus.

17 Claims, 5 Drawing Sheets

Fig_1

Fig_2

Fig_5

Fig_6

Fig_7

Fig_8

Fig_9

Fig_10

RETRACTABLE VEHICLE WASH APPARATUS

BACKGROUND OF THE INVENTION

1. Field of the Invention

The present invention relates generally to automatic vehicle wash systems and more particularly to a retractable wash curtain for use in such a system designed to be selectively elevated out of the path of movement of a vehicle.

2. Background of the Invention

There are many types of vehicle wash systems adapted to readily clean a vehicle without the need of handscrubbing. One basic form of wash system is merely to use a wand through which high-pressure water is emitted against the side of the vehicle with the wand normally being manipulated by an individual washing his or her own vehicle. More automated systems utilize the same concept of emitting jet sprays of water against the side of a vehicle but through use of an array of such nozzles disposed along both sides and across the top of the vehicle. Such arrays are sometimes adapted to move in a loop around the vehicle with the vehicle remaining in place while others move in a straight line across the vehicle with the vehicle remaining stationary. In either event, the object is to expose the entire exterior surface of the vehicle to the jet sprays of water to remove dirt, scum and other road debris from the surface of the vehicle.

More elaborate vehicles wash systems which are generally more efficient in cleansing the exterior surface of the vehicle have been referred to as tunnel-type car wash systems, wherein a vehicle is advanced through a series of stages spaced along a linear path with different operations occurring at the various stages as the vehicle is advanced through the tunnel. The various stages would include pre-soaking, rinsing, scrubbing, waxing and other similar operations. Generally in a tunnel-type wash system a fabric curtain, commonly referred to as a mitter curtain, defines one of the washing stages with the mitter curtain being comprised of a plurality of strips of felt or other similar material which are rocked back and forth along the path of movement of the vehicle so that as the vehicle is moved thereby, the felt strips will abrasively scrub and remove dirt and other debris from the surface of the vehicle. While this scrubbing action normally takes place in combination with a soapy water to minimize scratching the paint on the vehicle, it has been determined that repeated usage of such a cleaning system has a detrimental effect on the paint in that minor scratches are imparted to the surface, either by the felt fabric itself or by the granular dirt particles that the curtain removes from the surface of the vehicle.

As a result of the detrimental abrasion of a mitter curtain on the paint of a vehicle, many vehicle owners will not use tunnel-type vehicle wash systems for fear of damaging the paint on their vehicle and it has been determined that the owners of tunnel-type vehicle was system lose a substantial amount of business for this reason.

It would accordingly be desirable in tunnel-type vehicle wash systems to include a mitter curtain stage that was optional in use whereby an owner who did not want his vehicle scrubbed with the mitter curtain could so designate and the mitter curtain could be removed from the path of movement of that particular vehicle.

Others have recognized this shortcoming in tunnel-type vehicle wash systems and have devised several systems for coping with the problem. In U.S. Pat. No. 4,462,133 issued to Hanna on July 31, 1984, a curtain-like washing element is disclosed and includes a mechanism for folding the suspended curtain members into an elevated position whereby a vehicle can be passed therebeneath without engaging the curtain. In the system disclosed in the Hanna patent, a horizontal bar is adapted to be moved laterally against the curtain-like elements in one direction to swing an upper portion of the elements upwardly and a horizontal roll of water-resistant sheet material is provided and adapted to be unrolled laterally against the curtain-like elements in an opposite direction below the level of the bar to swing a lower portion of the elements upwardly so they can be suspended on the sheet material above the path of movement of a vehicle. This system is fairly complex and would appear to require a significant amount of time to operate. Where time is critical, this would appear to be a serious drawback to a system of this type.

U.S. Pat. No. 4,756,040 issued to Sereny on July 12, 1988, discloses another system wherein a curtain-type wash element can be removed from the path of movement of a vehicle. In this system, the curtain-like elements are disposed for retraction laterally out of the path of movement of the vehicle through the use of a plurality of pivotally interconnected links. Like the system disclosed in the Hanna patent, the Sereny system in fairly complex and accordingly is not totally satisfactory.

It is to satisfy the need for a dependable and retractable certain type washing system and to overcome the shortcomings in the prior art that the present invention has been developed. As will be appreciated from the detailed description hereinafter, a system has been designed which not only is adapted to selectively remove the curtain elements from the path of movement of a vehicle but does so in a rapid, efficient and dependable manner.

SUMMARY OF THE INVENTION

A wash apparatus for use in a tunnel-type vehicle wash system wherein a vehicle is moved along a linear path to encounter several stages of washing apparatus, includes a wash or mitter curtain of suspended fabric strips for selectively engaging the vehicle to frictionally remove dirt, grime and other road debris from the surface of the vehicle. The apparatus is designed such that the strips of material can be selectively elevated out of the path of movement of the vehicle.

The system utilizes a support member that extends transversely across the linear path of movement of the vehicle and has suspended therefrom a flexible curtain for engaging and scrubbing the surface of the vehicle. Drive means are provided for moving the support member in an orbital path above the vehicle such that the suspended flexible curtain is sequentially elevated and dropped against the surface of the vehicle as it is moved reciprocally in the path of movement of the vehicle. It has been found that the orbital movement of the curtain is more effective in scrubbing the surface of the vehicle than the rocking movement provided in most prior art systems.

The apparatus of the present invention further includes a brakeing system for selectively gripping the support member in a manner such that further orbital movement of the support member causes the curtain to be wrapped around the support member. Of course, wrapping the curtain about the support member elevates the curtain out of the path of movement of a vehicle in a very rapid manner so that the vehicle can be moved beneath the curtain without being engaged thereby.

It will therefore be appreciated that the apparatus of the present invention allows the operator of a vehicle wash system the option of washing a vehicle with or without the curtain and the option can be exercised and implemented in a rapid manner so as to not slow down the overall wash system for the vehicle.

Other aspects, features and details of the present invention can be more completely understood by reference to the following detailed description of a preferred embodiment, taken in conjunction with the drawings, and from the appended claims.

DESCRIPTION OF THE PREFERRED EMBODIMENT

Figures 1, 2:
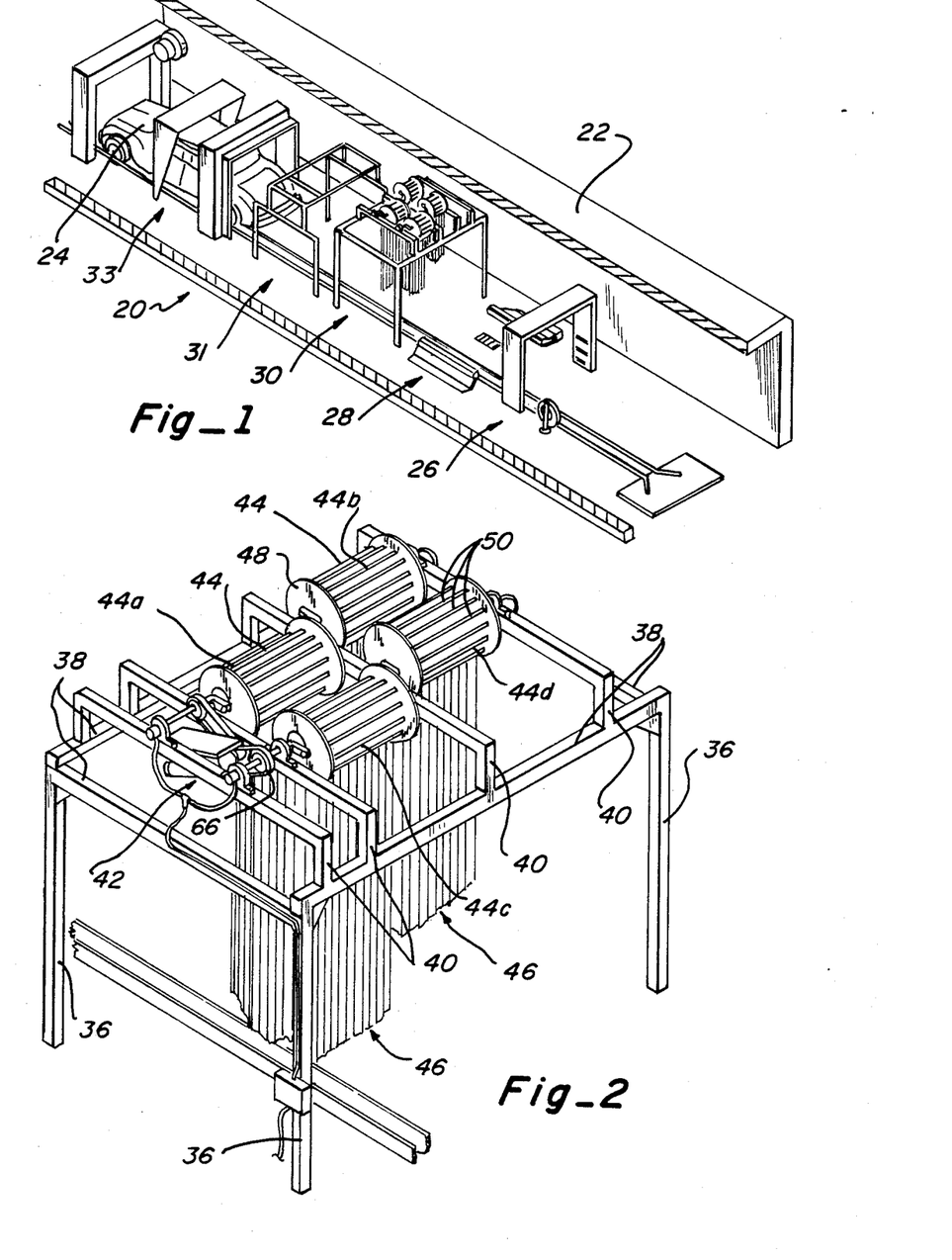
FIG. 1 is a perspective view with parts removed illustrating a tunnel-type car wash system incorporating the apparatus of the present invention.
FIG. 2 is a perspective view of the apparatus of the present invention.

Referring first to FIG. 1, a tunnel-type car wash system 20 is illustrated as being positioned in an elongated building structure 22 such that a vehicle 24 to be washed would follow a linear path entering the building at the right end and exiting from the left end. In passing through the system 20, the vehicle would encounter several stages, for example, a pre-soak stage 26 as the vehicle enters the wash system wherein a soapy solution would be deposited over the entire exterior surface of the vehicle, a tire-wheel cleaning station 28, a curtain scrub station 30, a rinse station 31, and a station 33 for blow drying and possibly applying a spray wax to the vehicle before it emerges from the exit end of the building structure. The present invention is concerned specifically with the scrubbing or curtain station 30 which will be described in detail hereinafter.

With reference to FIG. 2, the apparatus 32 of the present invention can be seen to include a support framework 34 defined by four vertically oriented legs 36, a horizontal rectangular framework 38 interconnecting the upper ends of the vertical legs 36, and four upstanding support arms 40 extending in the direction of the path of movement of a vehicle to be washed by the apparatus. The support arms 40 in turn form the mounting base for four support members 44 and for a drive mechanism 42 for moving the support members 44 in orbital paths above the linear path along which the vehicle 24 travels through the apparatus 32.

There are four identical support members 44a, 44b, 44c and 44d in the illustrated embodiment of the invention with the support members being divided into two identical pairs. One pair 44a and 44b extends laterally of the framework to substantially span the width of the path of movement of the vehicle through the apparatus and the second pair 44c and 44d is disposed in parallel relationship with the first pair to also span the same width. In this manner a vehicle passing through the apparatus will first encounter the pair 44c and 44d of support members and their depending curtain elements 46 and will subsequently encounted the second pair 44a and 44b of support members and their depending curtain elements 46.

Referring to FIGS. 2 through 9, support member 44a, is shown to consist of a pair of circular end walls 48 held in a spaced parallel relationship by a plurality of circumferentially spaced rigid bridging bars 50. The entire structure thereby resembles a cylinder having a horizontally disposed central longitudinal axis. As is best appreciated by reference to FIG. 8, each end wall 48 has a central opening 52 therethrough with a bearing member 54 mounted on the inner surface of the end wall circumscribing the opening 52 so as to rotatably receive a support shaft 56 associated with the support member and extending along the central longitudinal axis thereof.

The curtain element 46 which is suspended from each support member is comprised of a plurality of elongated strips 46a of preferably felt-like material which are commonly referred to in the trade as mitter curtain strips. The strips are secured at one end in adjacent side-by-side relationship to a bridging bar 50 and may be identical in length or vary in length depending upon the needs of a particular vehicle wash system. In the illustrated embodiment of the invention, the curtain strips 46a are suspended from six adjacent bridging bars so that six parallel curtains 46 composed of a plurality of side-by-side strips are actually depending from the same support member. This again is a variable depending upon the desires and needs of a particular vehicle wash system. It should be appreciated, however, that the curtain strips 46a in combination are suspended from one arcuate segment of the support member and due to the weight of the strips and the rotatable mounting of the support member 44 on the support shaft 56, the support member is substantially retained in one circumferential orientation due to gravitational forces acting on the support member through the curtain strips. As the strips, however, are dragged across the surface of a vehicle, they will tend to pivot the associated support member slightly about its support shaft.

Figure 3:
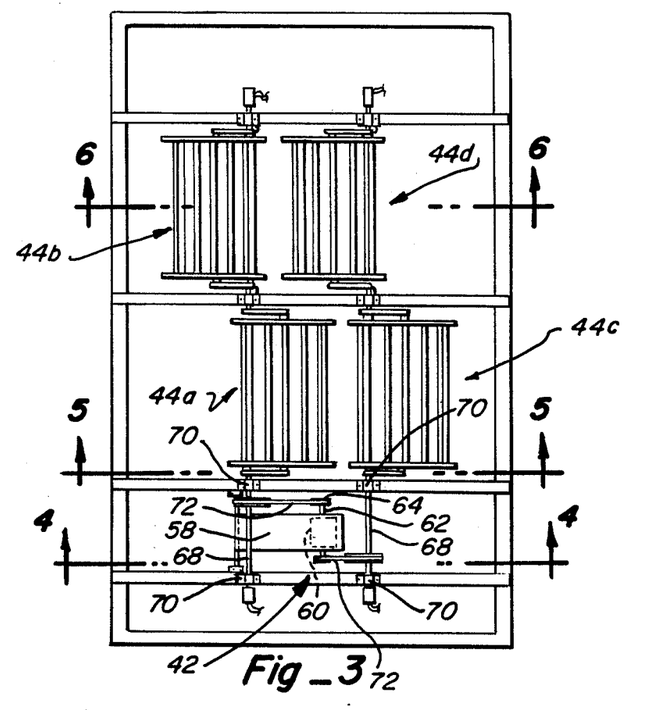
FIG. 3 is a top plan view of the apparatus of the present invention.
Figure 4:
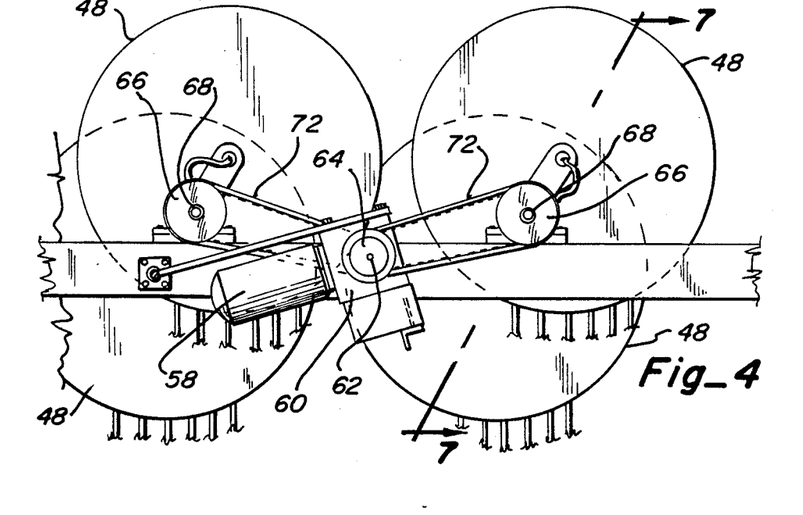
FIG. 4 is an enlarged section taken along line 4—4 of FIG. 3.
Figure 5:
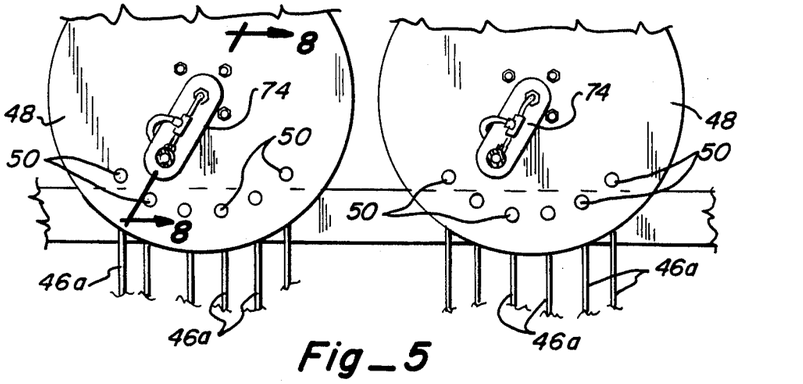
FIG. 5 is an enlarged section taken along line 5—5 of FIG. 3.
Figure 6:
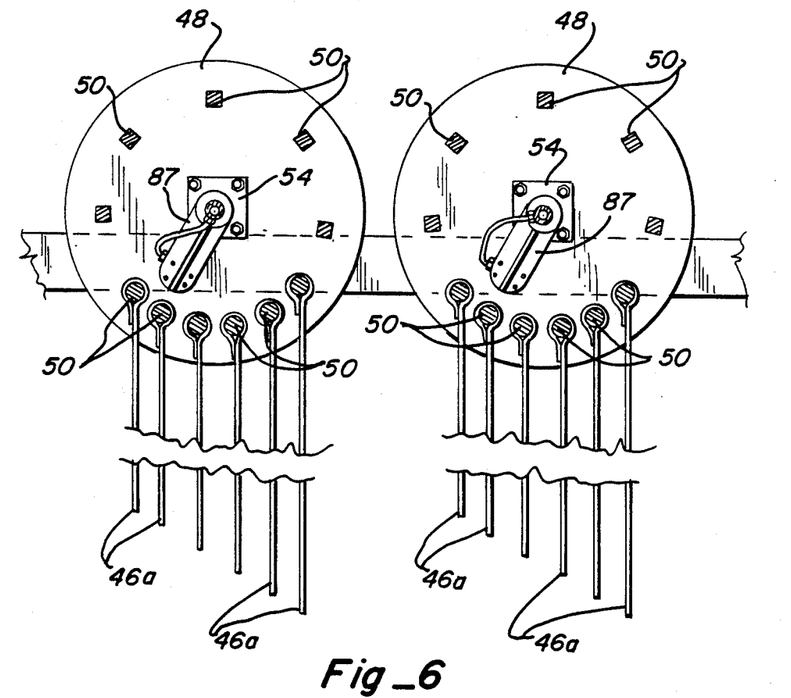
FIG. 6 is an enlarged section taken along line 6—6 of FIG. 3.
Figure 7:
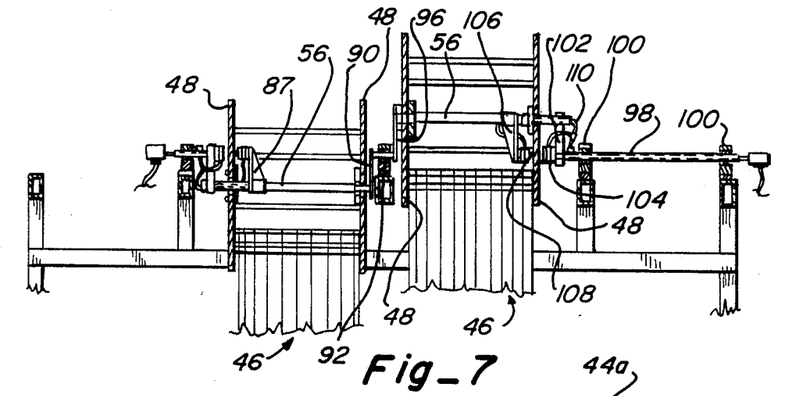
FIG. 7 is a reduced section taken along line 7—7 of FIG. 4.

The support member 44a is eccentrically mounted for rotation about an axis which is offset relative to its central longitudinal axis. This mounting is probably best illustrated in FIGS. 3, 4 and 8. With reference to FIGS. 3 and 4, it will be appreciated that the drive mechanism 42 for the apparatus includes an electric motor 58 mounted at one side of the apparatus between two of the support arms 40. The electric motor is operatively connected to a gear housing 60 so as to rotatably drive a horizontally disposed main drive shaft 62. The main drive shaft projects out of each end of the gear housing and carries a pair of drive pulleys 64 which are aligned with larger driven pulleys 66 on associated secondary drive shafts 68. There are two secondary drive shafts 68 which extend horizontally and transversely relative to the linear path of the vehicle with each secondary drive shaft being adapted to rotate one pair of the support members 44a and 44b or 44c and 44d. Each secondary drive shaft is rotatably supported on a pair of bearings 70 which are mounted on the top of two adjacent support arms 40 straddling the electric motor 58 and gear housing 60. The driven pulleys 66, of course, are keyed to the secondary drive shafts 68 to impart unitary rotation thereto. Drive belts 72 interconnect each driven pulley 66 with an associated drive pulley 64 so that operation of the electric motor effects a unitary rotation of each of the secondary drive shafts.

Figure 8:
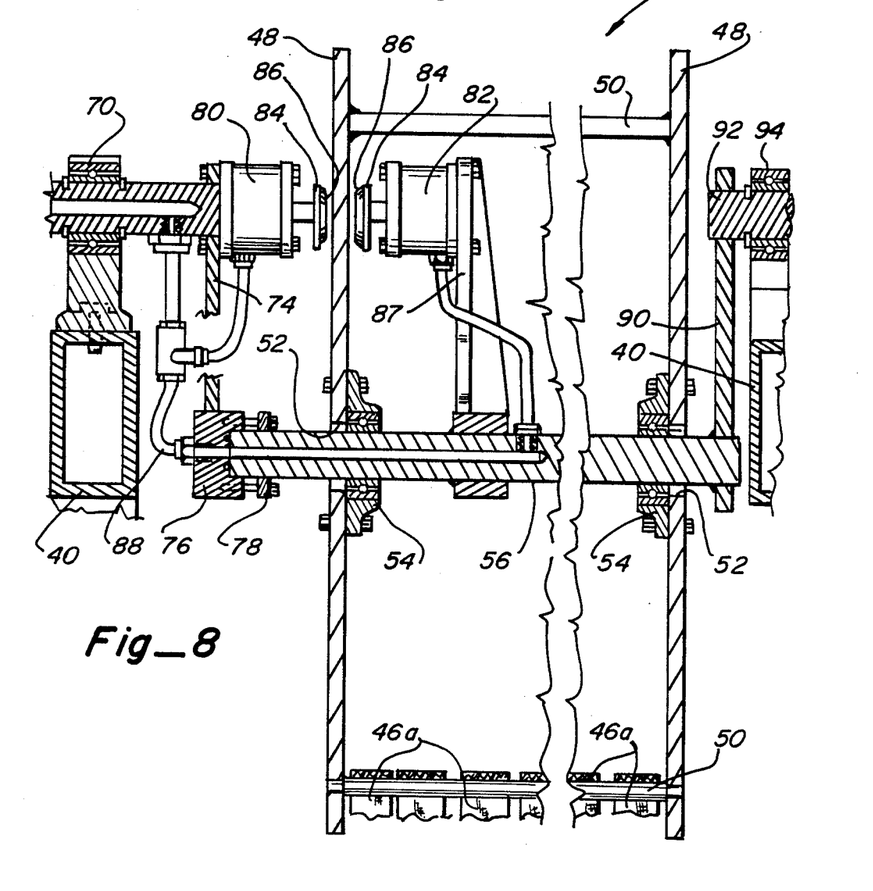
FIG. 8 is an enlarged section taken along line 8—8 of FIG. 5.
Figure 9:
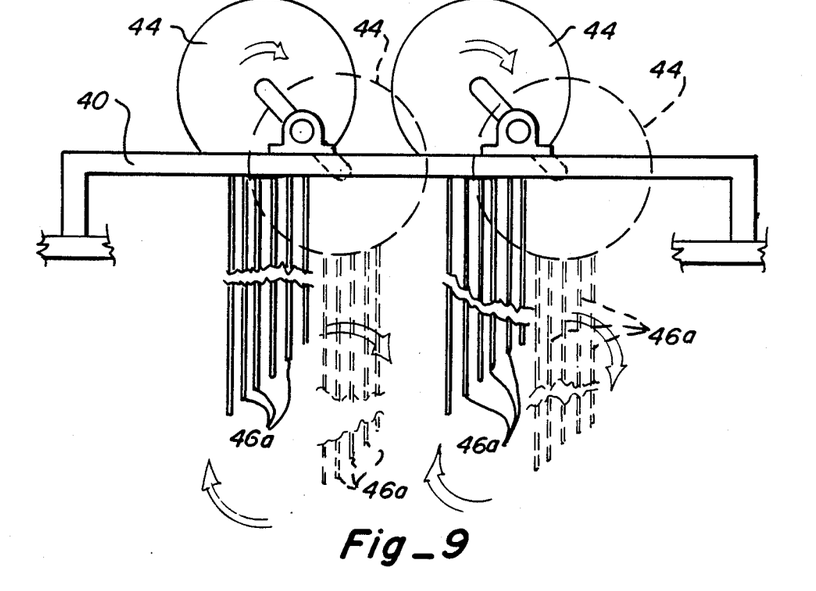
FIG. 9 is a diagramatic operational view illustrating the orbital path of movement of the various components of the apparatus of the present invention.

Referring to FIG. 8, it can be seen that a first link arm 74 is connected to one end of the secondary drive shaft 68 associated with the support member 44a so as to protrude laterally therefrom and is connected to the shaft 68 in a way such that it rotates in unison with the shaft. The link arm 74 can be welded to the shaft 68, keyed to the shaft or affixed thereto in any other suitable manner. The distal end of the link arm 74 carries a connection head 76 to which one end of the support shaft 56 associated with the support member 44a is connected. The support shaft is keyed to the connection head 76 and is held in place by a ring-like plate 78 secured to the support shaft and connected to the connection head by a plurality of bolt type fasteners. It will therefore be appreciated that the sup- port shaft 56 and the support member 44a, which is rotatably mounted thereon is movable in an orbital path about the longitudinal axis of the associated secondary drive shaft 68 upon rotation of the secondary drive shaft. As will also be appreciated, and as mentioned previously, due to the fact that the curtain strips 46a are mounted along one arcuate segment of the support member 44a, the support member is substantially retained in one circumferential orientation as it is moved through its orbital path. Of course, that orientation is with the curtain strips being disposed along a lower arcuate portion of the support member.

Figure 10:
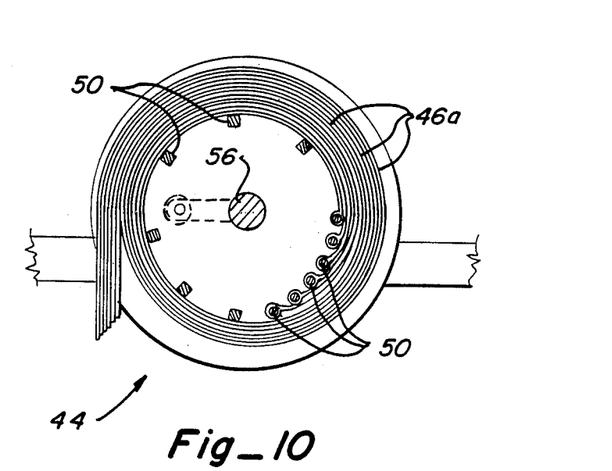
FIG. 10 is a transverse section taken through one of the support means utilized in the apparatus of the present invention.

A pair of brake members 80 and 82 are associated with the support member 44a to selectively prevent relative rotation between the support member and its support shaft for a purpose to become clear hereinafter. The brake members 80 and 82 each consist of an air actuated braking plate 84 having a pad 86 disposed on a face thereof and the braking members are positioned on opposite sides of one end wall 48 of the support member in axial alignment with the associated secondary drive shaft 68. As best seen in FIG. 8, one of the brake members 80 is disposed on one end of the associated secondary drive shaft by being anchored to the link arm 74 on the end of the secondary drive shaft. The opposing brake member 82 is mounted on a second link arm 87 with the second link arm being fixed to the associated support shaft for unitary rotation therewith. It will therefore be appreciated, that when the air actuated brakes are activated, the brake pads 86 are advanced against the opposite sides of the associated end wall 48 of the support member 44a to grip the wall, thereby preventing rotation of the support member relative to the support shaft upon which it is mounted. It will also be appreciated, that when the braking system is activated in this manner, the support member will be forced to rotate about the longitudinal axis of the secondary drive shaft 68 associated therewith, thereby overcoming the gravitational forces which normally hold the support member in one circumferential orientation. As the orbital movement of the support member occurs with the brake system activated, the curtain strips 46a are wound about the support member as shown in FIG. 10, thereby elevating the strips above the path of movement of the vehicle 24 through the apparatus. In the disclosed embodiment, the brake members are pneumatically activated and piping therefor passes through the center of the secondary drive shaft, through exposed piping 88 and through a passage provided in the support shaft in a conventional manner.

The opposite end of the support shaft 56 from that connected to the first link arm 74 has a third link arm 90 connected thereto for unitary rotation with the support shaft. The third link arm 90 extends in a parallel relationship with the first link arm 74 and in the same direction from the support shaft. The third link arm is in turn anchored at its opposite end (FIG. 7) to an idler shaft 92 which is supported in a bearing block 94 on top of one of the support arms 40. The opposite end of the idler shaft 92 is fixed to a fourth link arm 96 which in turn has its opposite end fixed to the support shaft 56 of the adjacent support member 46b or the second support member of this pair. The third and fourth link arms 90 and 96 respectively extend in opposite directions from the idler shaft 92 so as to form a 180 degree angle relative to each other. It will therefore be appreciated that the two support members 44a and 44b associated with a designated secondary drive shaft are disposed at a 180 degree offset relationship relative to the longitudinal axis of the associated secondary drive shaft.

A second idler shaft 98 is disposed in bearing blocks 100 mounted on two adjacent support arms 40 on the side of the support member 44b furthest displaced from the associated secondary drive shaft 68. The second idler shaft 98 has a fifth link arm 102 thereon fixed to the support shaft 56 of the support member 44b and also has a brake member 104 identical to the brake member 80 on its axial end which is connected to the fifth link arm by bolt-type fasteners. A sixth link arm 106 is provided interiorly of the support member 44b which carries an opposing brake member 108 identical to the brake member 82 on a distal end thereof in opposing relationship to the brake member 104. The sixth link arm 106 is fixed to the support shaft 56 of the support member 44b for unitary rotation therewith. The pneumatics for the brake members 104 and 106 associated with the support member 44b pass through a central passage in the second idler shaft 98 as well as through external piping 110 and a passage provided in the support shaft 56 of the support member 44b.

The identical second pair of support members 44c and 44d are mounted in parallel relationship to the first pair and are driven off the other secondary drive shaft 68. Since the orbital movement of each pair of support members is synchronized due to being driven off the same primary drive shaft 62, and since each support member in a pair is offset 180° from the other support member in the pair, unnecessary vibration is avoided in the apparatus.

There are two readily apparent advantages in the apparatus of the present invention, with one being the orbital movement of the curtain strips 46a which is felt to provide a more effective scrubbing action than the mere rocking movement normally imparted to such strips in conventional vehicle wash systems. As can be appreciated with reference to FIG. 9, the orbital motion of the strips is of course created by the orbital motion of the support members 44 from which the strips are mounted. In this manner, the strips are elevated and subsequently lowered while being moved back and forth as a direct consequence of the orbital path of movement. This motion takes place while the strips are in engagement with the exterior surface of the vehicle 24 to scrub the surface in an effective and efficient manner.

Another distinct advantage of the apparatus of the present invention resides in the fact that the curtain strips 46a can be readily wound around an associated support member 44 merely by activating the brake system to cause the associated support member to rotate with its support shaft around the longitudinal axis of the secondary drive shaft to which it is associated. Accordingly, in a vehicle wash system of the type illustrated in FIG. 1, an option is provided to remove the strips 46a from the path of movement of the vehicle if the owner of the vehicle does not want his vehicle washed with curtain strips which have been known with repeated use to detrimentally affect the paint of a vehicle. FIG. 10 illustrates the strips of one support member being wrapped therearound. It will be readily appreciated that when the brake system is de-energized to permit free rotation between the support members 44 and the associated support shafts 56, the support members will automatically rotate due to the force of gravity on the curtain strips 46a to allow the curtain strips to be unwound and again extend downwardly to engage the next vehicle passing through the wash apparatus. It should also be apparent that when the curtain strips have been wound around the support members to remove the strips from an engaging position with the vehicle, the drive means is deenergized until such time as it is desired that the strips be re-deployed in an engaging position. At this point in time the brake systems are de-energized and the drive means energized to place the apparatus in a washing mode.

Although the present invention has been described with a certain degree of particularity, it is understood that the present disclosure has been made by way of example, and changes in detail or structure may be made without departing from the spirit of the invention, as defined in the appended claims.

I claim:

1. An apparatus for use in a wash system for cleaning a vehicle wherein one of said apparatus and vehicle is moveable along a linear path relative to the other of said apparatus and vehicle, said apparatus comprising in combination:
   a frame elongated support means extending laterally of said linear path at an elevated position relative to said vehicle,
   a support shaft on said frame rotatably supporting the support means,
   flexible curtain means suspended from said support means in a position to be selectively engaged by a vehicle along said path,
   drive means operatively associated with said support shaft for moving the support means in an orbital path, and
   break means for selectively preventing the support means from rotating relative to the support shaft whereby the curtain means an be selectively wrapped around the support means as the support means is moved in an orbital path to elevate the curtain means above a vehicle disposed along said linear path.

2. The apparatus of claim 1 wherein said support means has a central longitudinal axis and the support shaft is coincident with said axis, and wherein the drive means includes a drive shaft having a central longitudinal axis parallel to but non-coincident with the support shaft, and link means operatively connecting the drive shaft with the support shaft whereby the orbital movement of the support means is concentric with the axis of the drive shaft.

3. The apparatus of claim 2 wherein said support means includes a pair of end walls and bridging means extending between said end walls from which the curtain means is suspended.

4. The apparatus of claim 3 wherein said brake means includes friction means for selectively engaging at least one of said end walls.

5. The apparatus of claim 4 wherein said brake means include a pair of confronting pads disposed on opposite sides of at least one of said end walls and means for selectively advancing the pads toward each other to confine the associated end wall therebetween.

6. The apparatus of claim 5, wherein said confronting pads are disposed along the axis of said drive shaft.

7. The apparatus of claim 6 wherein said pads are mounted for unitary rotation with said drive shaft about the axis of said drive shaft.

8. The apparatus of claim 7 wherein said pads are operatively mounted on said support shaft for unitary rotation therewith about the axis of said drive shaft.

9. The apparatus of claim 3 wherein said bridging means comprises a plurality of rigid rods spaced circumferentially and interconnecting the end walls.

10. The apparatus of claim 2 wherein the curtain means consists of a plurality of felt strips adapted to engage the surface of a vehicle to scrub the surface as a result of the orbital movement of the support means from which the strips are suspended.

11. The apparatus of claim 1 wherein said support means includes a pair of end walls and bridging means extending between said end walls from which the curtain means is suspended.

12. An apparatus for use in a wash system for cleaning a vehicle wherein one of said apparatus and vehicle is moveable along a linear path relative to the other said apparatus and vehicle, said apparatus comprising in combination:
   a frame, a plurality of elongated support means which in combination extend across said linear path at an elevated position relative to said vehicle, each of said support means being rotatably mounted on a support shaft on said frame,
   flexible curtain means suspended from each of said support means in a position to be engaged by said vehicle,
   drive means associated with each of said support shafts for moving the support means in independent orbital paths, and
   break means for selectively preventing each of said support means from rotating relative to its associated support shaft whereby the curtain means can be selectively wrapped around the associated support means as the support means are moved in an orbital path to elevate the curtain means above said vehicle disposed along said linear path.

13. The apparatus of claim 12 wherein each of said support means has a central longitudinal axis and the associated support shaft is coincident with said axis, and wherein the drive means includes a drive shaft with a central longitudinal axis associated with each support means and being parallel to but non-coincident with the associated support shaft, and link means operatively connecting the drive shafts with an associated support shaft whereby the orbital movements of the support means are concentric with the axis of the associated drive shafts.

14. The apparatus of claim 13 wherein there are two pair of support means with each pair being associated with a different drive shaft and each pair in combination extending across said path.

15. The apparatus of claim 14 wherein the support means of each pair are diametrically opposed relative to the axis of the associated drive shaft.

16. an apparatus for use in a wash system for cleaning a vehicle wherein one of said apparatus and vehicle is moveable along a linear path relative to the other of said apparatus and vehicle, said apparatus comprising in combination:

a frame;

support means mounted on said frame and extending laterally of said linear path at an elevated position relative to said vehicle, said support means having flexible curtain means suspended therefrom and hanging vertically in a position to be engaged by a vehicle disposed along said path, and drive means for moving said support means in a circular orbital path about a horizontal axis while permitting said curtain means to remain in a vertical orientation.

17. The apparatus of claim 16 further including a support shaft rotatably connected to the shaft means and connection means operably connecting the support shaft to the drive means such that the drive means moves the support shaft through said orbital path.

* * * * *